United States Patent
Okazaki et al.

(10) Patent No.: US 6,873,713 B2
(45) Date of Patent: Mar. 29, 2005

(54) IMAGE PROCESSING APPARATUS AND METHOD FOR EXTRACTING FEATURE OF OBJECT

(75) Inventors: Akio Okazaki, Yokohama (JP); Toshio Sato, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 652 days.

(21) Appl. No.: 09/808,939

(22) Filed: Mar. 16, 2001

(65) Prior Publication Data

US 2003/0206645 A1 Nov. 6, 2003

(30) Foreign Application Priority Data

Mar. 16, 2000 (JP) .................................... 2000-074489
Nov. 14, 2000 (JP) .................................... 2000-347043

(51) Int. Cl.[7] .............................................. G06K 9/00
(52) U.S. Cl. ...................... 382/118; 340/5.53; 340/5.83
(58) Field of Search ................................. 382/115, 116, 382/117, 118, 154, 173; 340/5.1, 5.2, 5.52, 5.53, 5.8–5.86; 348/47, 50

(56) References Cited

U.S. PATENT DOCUMENTS

| 4,641,349 A | * | 2/1987 | Flom et al. .................. 382/117 |
| 4,975,969 A | * | 12/1990 | Tal .............................. 382/116 |
| 5,230,025 A | | 7/1993 | Fishbine et al. |
| 5,995,639 A | * | 11/1999 | Kado et al. .................. 382/118 |
| 6,119,096 A | * | 9/2000 | Mann et al. .................... 705/5 |

FOREIGN PATENT DOCUMENTS

JP 11-196398 7/1999

OTHER PUBLICATIONS

Kazuhiro Fukui et al., "Facial Feature Point Extraction Method Based on Combination of Shape Extraction and Pattern Matching", Journal of IEICE (D–11), vol. J–80–D–II, No. 8, Aug. 1997.

Osamu Yamaguchi et al., "Face Recognition System using Temporal Image Sequence", IEICE Transactions PRMU 97–50, Jun. 1997.

Gordon, "Face Recognition from Frontal and Profile Views," *The International Workshop on Automatic Face and Gesture Recognition*, Zurich, Jun. 26–28, 1995, XP–002297247.

Yasumoto et al., "Face Direction Estimation and Face Recognition Using Multiple Cameras for Communication in a Virtual Environment," *IEEE*, 2000, pp. 295–300, XP–010569634.

Xu et al., "Detecting Head Pose from Stereo Image Sequence for Active Face Recognition," *IEEE*, 1998, pp. 82–87, XP–010277648.

* cited by examiner

Primary Examiner—Bhavesh M. Mehta
Assistant Examiner—John Strege
(74) *Attorney, Agent, or Firm*—Pillsbury Winthrop LLP

(57) ABSTRACT

In this invention, a facial image is sensed from different directions, pupil and nasal cavity regions are detected from the sensed facial image, feature points are detected from the detected regions, a feature pattern is extracted on the basis of the feature points, and the feature pattern is registered or is verified with a registered feature pattern to identify a person.

26 Claims, 9 Drawing Sheets

X: FEATURE POINT

IMAGE PROCESSING APPARATUS AND METHOD FOR EXTRACTING FEATURE OF OBJECT

CROSS-REFERENCE TO RELATED APPLICATIONS

This application is based upon and claims the benefit of priority from the prior Japanese Patent Applications No. 2000-074489, filed Mar. 16, 2000; and No. 2000-347043, filed Nov. 14, 2000, the entire contents of both of which are incorporated herein by reference.

BACKGROUND OF THE INVENTION

The present invention relates to an image processing apparatus and method, which are applied to entrance/exit management of an important facility, or access management of a computer (terminal device) and are suitably applied to a personal authentication apparatus for authenticating a person on the basis of vital information (biometrics) such as a facial image.

In recent years, in view of application to a human interface, security, and the like, a personal authentication technique based on vital information (biometrics) such as a facial image, or the like is becoming increasingly important, and various techniques have been developed.

As biometrics, fingerprints, palmprints, voiceprints, and signature verifications, retina and iris scans, and the like are put into practical use. These schemes are categorized into "contact type" a person must directly touch a device, and "non-contact type" a person need not touch.

Of the above examples of biometrics, fingerprints, palmprints, and signature verifications belong to "contact type". However, the category of signature verifications is slightly different from that of fingerprint verification and the like since a signature verification requires a person to take an action, i.e., to sign.

Biometric that similarly requires person's action is voiceprint (speech) verification, but it belongs to "non-contact type". Retina and iris scans belong to "non-contact type" since a camera captures an image of a desired portion and the captured image is processed. However, since a retina is located at the bottom of an eyeball and must be scanned while the eye nearly contacts a lens, its category is close to "contact type".

Note that the iris is present on the surface of the eyeball, and can be scanned by a camera at a separate position. However, since a micropattern must be scanned, the maximum distance between the eye and camera is naturally limited.

On the other hand, facial image verification as non-contact biometric has received a lot of attention recently, and various techniques using this have been developed. A facial pattern has a larger scale than the aforementioned iris pattern.

In a personal authentication apparatus that adopts facial image verification, one monitor camera is set at an appropriate position to capture a facial image of a full-face or nearly full-face pose, and the captured image undergoes pattern verification with facial image data registered in advance under similar conditions.

Also, a system in which a camera is set at a relatively lower position to capture a looked-up facial image and to register and verify it has been proposed.

For example, Jpn. Pat. Appln. KOKAI Publication No. 11-196398 discloses a technique that pertains to an image processing apparatus in which video cameras are laid out to make a given angle, a facial image of a full-face pose is stored in a full-face template memory, a facial image of a left-half-face pose is stored in a half-face template memory, and the correlation between images output from the video cameras and data stored in the memories is computed to determine the facial motion of a person (to be referred to as prior art 1 hereinafter).

Furthermore, Fukui and Yamaguchi, "Facial Feature Point Extraction by Combining Shape Extraction and Pattern Verification", Journal of IEICE (D-II), Vol. j-80-D-II, No. 8, August 1997, proposes a method of extracting facial feature points of a pupil, nasal cavity, mouth edge, and the like from a moving image at high speed and high precision for facial recognition (to be referred to as prior art 2 hereinafter).

Also, Yamaguchi, Fukui, and Maeda, "Facial Recognition System Using Moving Image", IEICE Transactions PRMU97-50, June 1997, proposes a personal identification method for facial recognition using a moving image (time-series images) in place of a single image (to be referred to as prior art 3 hereinafter).

BRIEF SUMMARY OF THE INVENTION (1) An image processing apparatus of the present invention comprises a plurality of image sensing means for sensing object images from different directions, normalization means for extracting feature points from the object images sensed by the plurality of image sensing means, setting a feature region on the basis of the extracted feature points, segmenting the set feature region into a plurality of regions, computing an average value of brightness levels in each segmented region, and computing a feature pattern on the basis of the computed average value, registration means for registering the feature pattern computed by the normalization means as a feature pattern associated with a predetermined object, and verification means for specifying an object associated with the object image by comparing the feature pattern computed by the normalization means with the feature pattern registered in the registration means.

(2) An image processing apparatus of the present invention comprises image input means for sensing an object image from different positions, and inputting a plurality of object images at different image sensing positions, feature extraction means for extracting feature patterns that represent features of an object from the plurality of object images input by the image input means, verification means for verifying the plurality of feature patterns extracted by the feature extraction means with a reference feature pattern which is registered in advance, and discrimination means for, when at least one of the plurality of feature patterns extracted by the feature extraction means matches the reference feature pattern which is registered in advance as a result of verification of the verification means, determining that an object associated with that object image is a person himself or herself.

(3) An image processing apparatus of the present invention comprises image input means for sensing an object image from different positions, and inputting a plurality of object images at different image sensing positions, input image determination means for determining an image sensing position of an object image to be used from the plurality of object images input by the image input means upon registration of a feature pattern, first feature extraction means for extracting a feature pattern which represents a feature of an object from the object image determined by the input image determination means, registration means for registering the feature pattern extracted by the first feature extraction means as a reference feature pattern associated with the object in correspondence with position information indicating the image sensing position of the corresponding object image, verification image selection means for selecting an object image at an image sensing position, which corresponds to the position information registered together with the feature pattern of the object to be verified registered in the registration means, of the plurality of object images input by the image input means upon verification of a feature pattern, second feature extraction means for extracting a feature pattern which represents a feature of the object from the object image selected by the verification image selection means, and verification means for specifying an object associated with the object image by verifying the feature pattern extracted by the second feature extraction means with the feature pattern of the object to be verified registered in the registration means.

(4) An image processing method of the present invention comprises the first step of sensing object images from different directions, the second step of extracting feature points from the object images sensed in the first step, setting a feature region on the basis of the extracted feature points, segmenting the set feature region into a plurality of regions, computing an average value of brightness levels in each segmented region, and computing a feature pattern on the basis of the computed average value, the third step of registering the feature pattern computed in the second step as a feature pattern associated with a predetermined object, and the fourth step of specifying an object associated with the object image by comparing the feature pattern computed in the second step with the feature pattern registered in the third step.

(5) An image processing method of the present invention comprises the first step of sensing an object image from different positions, and inputting a plurality of object images at different image sensing positions, the second step of extracting feature patterns that represent features of an object from the plurality of object images input in the first step, the third step of verifying the plurality of feature patterns extracted in the second step with a reference feature pattern which is registered in advance, and the fourth step of determining, when at least one of the plurality of feature patterns extracted in the second step matches the reference feature pattern which is registered in advance as a result of verification of the third step, that an object associated with that object image is a person himself or herself.

(6) An image processing method of the present invention comprises the first step of sensing an object image from different positions, and inputting a plurality of object images at different image sensing positions, the second step of determining an image sensing position of an object image to be used from the plurality of object images input in the first step upon registration of a feature pattern, the third step of extracting a feature pattern which represents a feature of an object from the object image determined in the second step, the fourth step of registering the feature pattern extracted in the third step as a reference feature pattern associated with the object in correspondence with position information indicating the image sensing position of the corresponding object image, the fifth step of selecting an object image at an image sensing position, which corresponds to the position information registered together with the feature pattern of the object to be verified registered in the fourth step, of the plurality of object images input in the first step upon verification of a feature pattern, the sixth step of extracting a feature pattern which represents a feature of the object from the object image selected in the fifth step, and the seventh step of specifying an object associated with the object image by verifying the feature pattern extracted in the sixth step with the feature pattern of the object to be verified registered in the fourth step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described hereinafter with reference to the accompanying drawings.

The first embodiment of the present invention will be described below.

Figure 1:
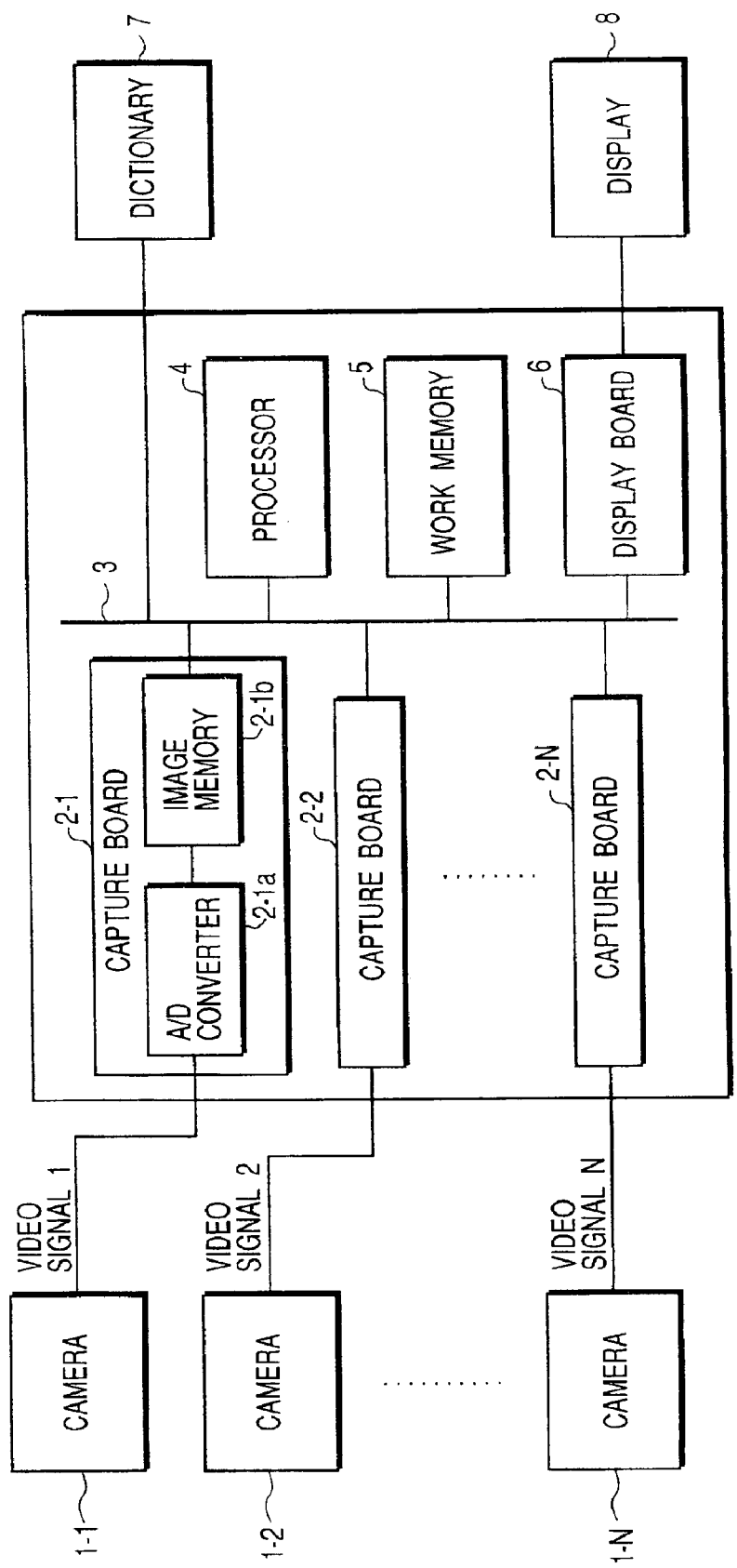
FIG. 1 is a schematic block diagram showing the arrangement of an image processing apparatus according to the first embodiment of the present invention.

FIG. 1 shows the arrangement of an image processing apparatus according to the first embodiment. Referring to FIG. 1, a plurality of video cameras (to be simply referred to as cameras hereinafter) 1-1, 1-2, . . . , 1-N as image sensing means for sensing an object image line up vertically to have a given spacing. This embodiment uses video cameras that can sense monochrome images. The outputs from the cameras 1-1, 1-2, . . . , 1-N are respectively connected to capture boards 2-1, 2-2, . . . , 2-N.

That is, a video signal (analog data) 1 from the camera 1-1 is converted into digital data by an A/D converter 2-1a, and the digital data is temporarily stored in an image memory 2-1b. The capture boards 2-2, . . . , 2-N similarly comprise A/D converters and image memories (not shown for the sake of simplicity), and video signals 2 to N undergo similar processes in the capture boards 2-2, . . . , 2-N.

When each of the cameras 1-1, 1-2, . . . , 1-N comprises a USB (Universal Serial Bus) interface, a USB interface is added in place of the A/D converter 2-1a. The same applies to a case wherein the camera comprises a digital I/O interface such as IEEE1394 other than USB.

The capture boards 2-1, 2-2, . . . , 2-N, a processor 4, a work memory 5, a display board 6, and a dictionary 7 are connected to each other via a system bus 3 so as to be able to communicate with each other. Furthermore, a display 8 is connected to the display board 6. The dictionary 7 is a registration means in which a plurality of dictionary data (reference feature patterns) are registered (stored). The display 8 outputs, e.g., a verification result.

The processor 4 sends a control signal for taking synchronization to the cameras 1-1, 1-2, . . . , 1-N, receives digital data that pertain to facial images sent from the cameras 1-1, 1-2, . . . , 1-N, and executes facial image registration, verification, and determination processes (to be described later) of the received data using the work memory 5 and dictionary 7.

Note that processors exclusively used to process images sensed by the cameras 1-1, 1-2, . . . , 1-N may be parallelly arranged to achieve high-speed processing.

Figure 2:
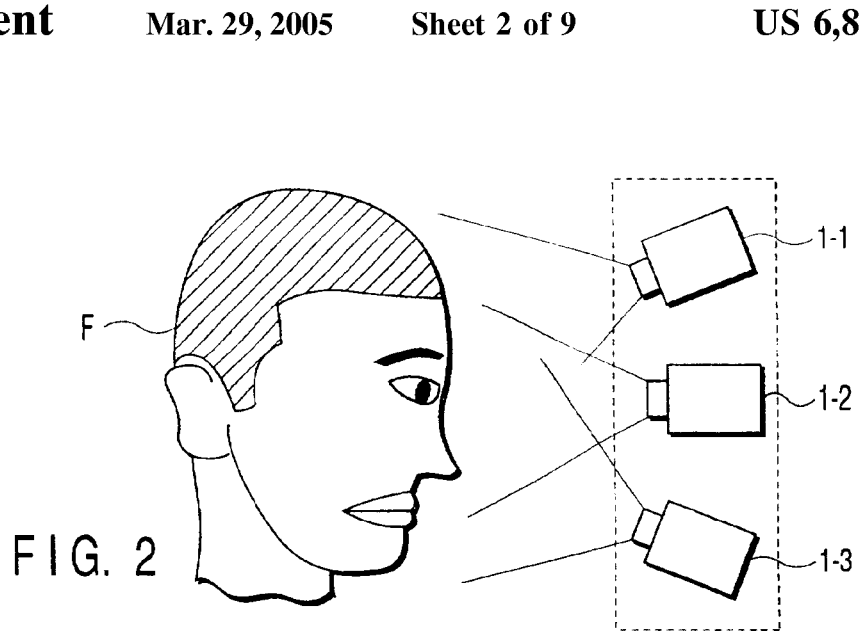
FIG. 2 shows an example of a camera layout in the first embodiment.
Figure 3:
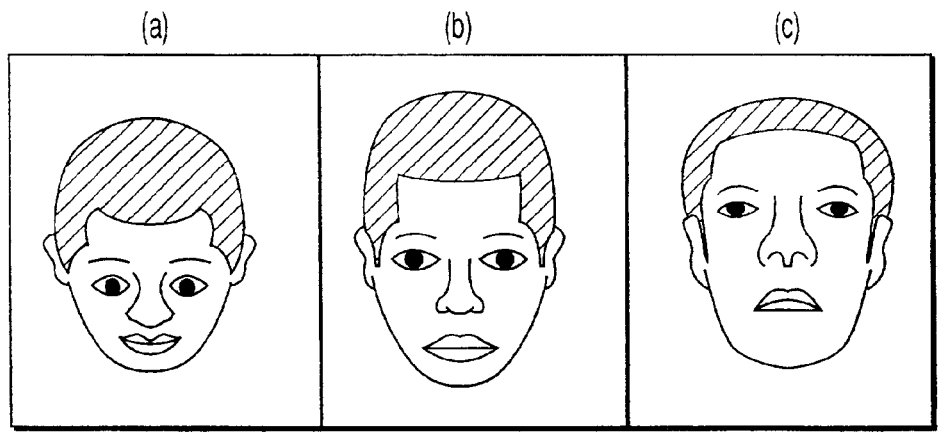
FIG. 3 shows examples of facial images captured by respective cameras in the first embodiment.

FIG. 2 shows details of an example of the layout of the cameras 1-1, 1-2, . . . , 1-N, and FIG. 3 show examples of facial images sensed by the cameras 1-1, 1-2, . . . , 1-N.

In this example, three cameras 1-1, 1-2, and 1-3 line up vertically to have an appropriate spacing, and an object (face) F is located in front of these cameras 1-1, 1-2, and 1-3. With this layout, the cameras 1-1, 1-2, and 1-3 respectively sense and capture a looked-down facial image (see (a) of FIG. 3), a frontal facial image (see (b) of FIG. 3), and a looked-up facial image (see (c) of FIG. 3).

Note that the cameras 1-1, 1-2, and 1-3 are illustrated as independent input devices. Alternatively, the cameras 1-1, 1-2, and 1-3 may be stored in a single housing, so that they appear as a single input device for the user.

The facial image registration and verification processes by the processor 4 of the image processing apparatus of the first embodiment will be described in detail below with reference to the flow chart shown in FIG. 4.

Figure 4:
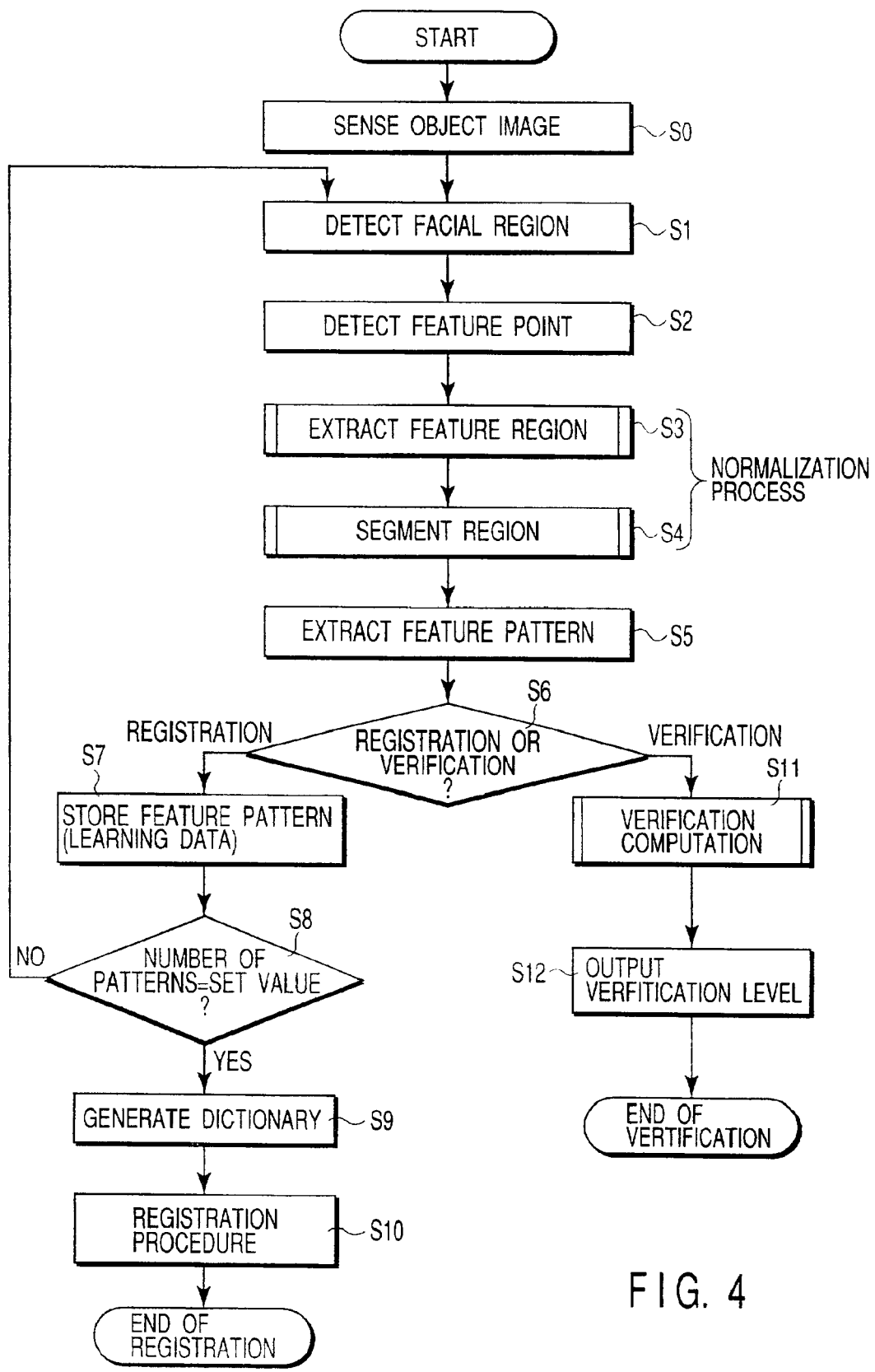
FIG. 4 is a flow chart for explaining facial image registration and verification processes by a processor according to the first embodiment.

Note that the flow chart in FIG. 4 shows processes to be individually done for facial images captured by the cameras 1-1, 1-2, and 1-3.

Figure 5:
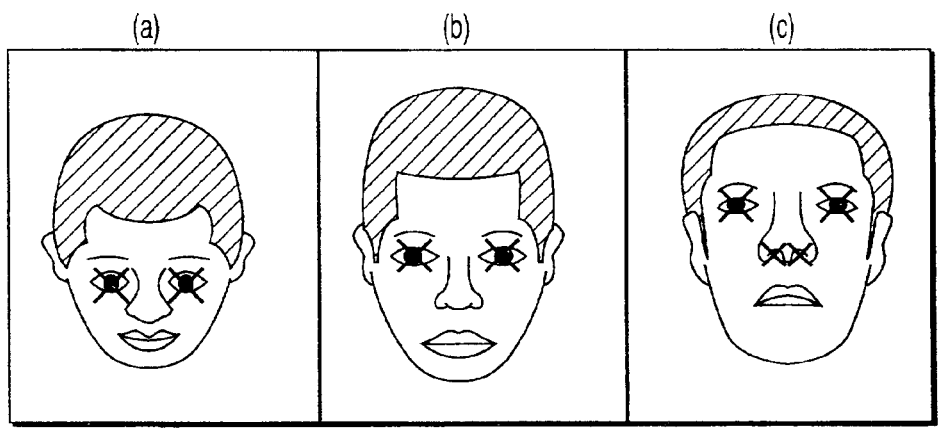
FIG. 5 shows examples of feature point extraction results in the first embodiment.

The cameras 1-1, 1-2, and 1-3 sense an object image from different directions (S0). The processor 4 seeks a facial image region from the entire input image (S1). Pupil and nasal cavity regions, which are regarded as substantially circular regions, are detected, and the central positions of these regions are detected as feature points of the facial image (S2). Note that the processes in steps S1 and S2 can adopt the conventional method described in, e.g., prior art 2. The detection results of the feature points are as shown in (a), (b), and (c) of FIG. 5, and "x" marks in these figures indicate the detected feature points. Note that (a) of FIG. 5 corresponds to the facial image captured by the camera 1-1, (b) of FIG. 5 corresponds to the facial image captured by the camera 1-2, and (c) of FIG. 5 corresponds to the facial image captured by the camera 1-3.

Then, a normalization process including extraction of a feature region (S3) and segmentation of the region (S4) is executed. The normalization process in steps S3 and S4 is a core of the facial image registration and verification processes in this embodiment. The normalization process will be described in detail below with reference to FIGS. 6 and 7.

Figure 6:
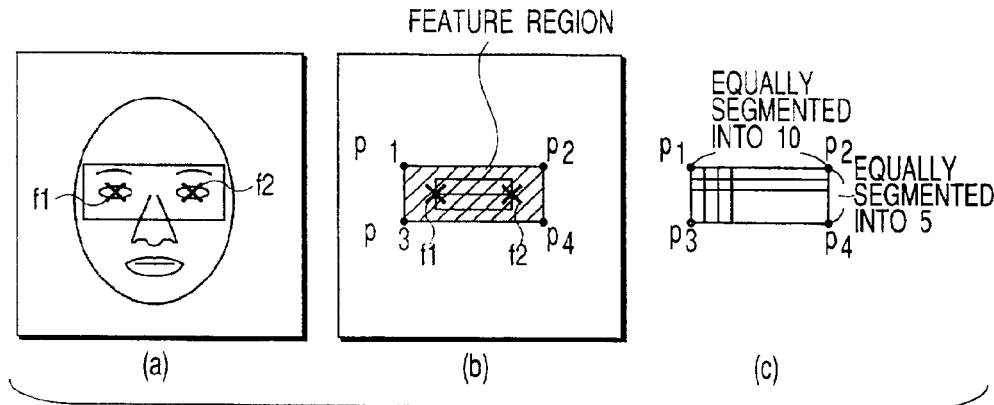
FIG. 6 is a view for explaining a normalization process in the first embodiment.
Figure 7:
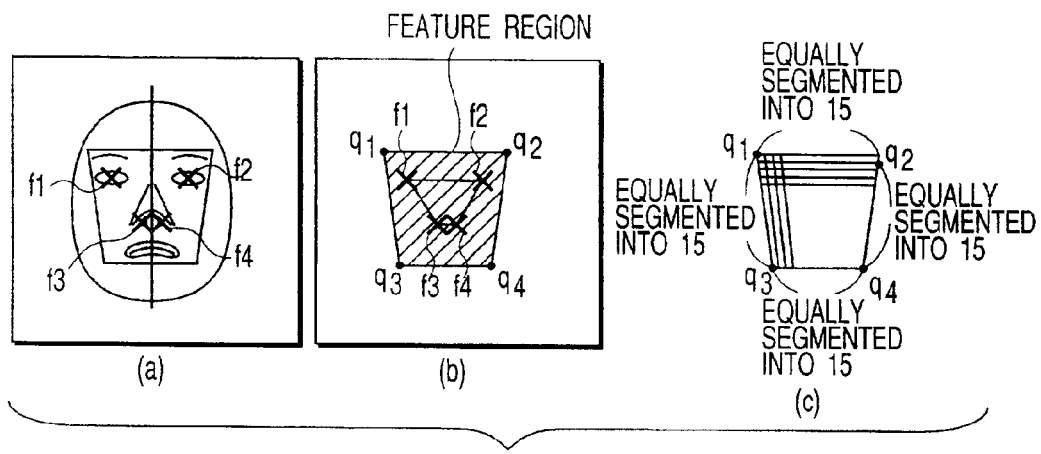
FIG. 7 is a view for explaining a normalization process in the first embodiment.

As shown in FIGS. 6 and 7, the normalization process takes different procedures depending on the number of obtained feature points (two or four points). If the number of obtained feature points is other than 2 or 4, the normalization process is skipped.

A feature region is defined as a rectangle obtained by enlarging a rectangle specified by a plurality of feature points at a magnification set for each camera. More specifically, when two feature points are obtained, as shown in, e.g., (a) of FIG. 6, a rectangular region (p1, p2, p3, p4) obtained by further enlarging a rectangle formed by giving a predetermined width to a line segment f1f2 at a predetermined magnification is defined as a feature region, as shown in (b) of FIG. 6. In this example, the obtained feature region is broken up into 10×5 small rectangular regions, as shown in (c) of FIG. 6.

On the other hand, when four feature points are obtained, as shown in, e.g., (a) of FIG. 7, a rectangular region (q1, q2, q3, q4) obtained by further enlarging a rectangle formed by giving a predetermined width to line segments f1f2 and f3f4 at a predetermined magnification is defined as a feature region, as shown in (b) of FIG. 7. In this example, the obtained feature region is broken up into 15×15 small rectangular regions, as shown in (c) of FIG. 7.

In this embodiment, a rectangular feature region is used. However, the present invention is not limited to this as long as a region can be uniquely computed from two or four feature points. On the other hand, the feature region is broken up by equally segmenting the respective sides of the rectangle. Alternatively, the segmented small areas may have variable sizes, i.e., areas, in consideration of feature strength. The number of equally segmented areas is not limited to the aforementioned values. As a characteristic feature of the image processing apparatus of this embodiment, parameters of the normalization process can be optimized in units of cameras.

Figure 8:
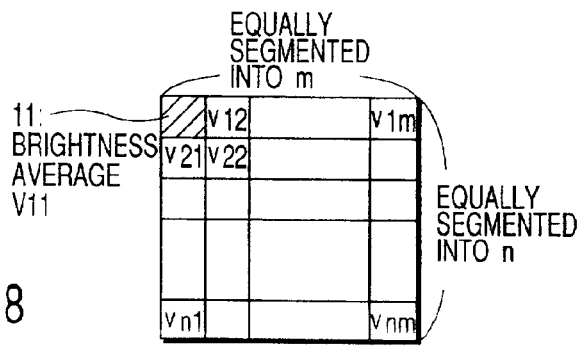
FIG. 8 is a view for explaining a scheme for computing a feature pattern in a vector format in the first embodiment.

The description will revert to FIG. 4. A feature pattern for registration and verification is computed (extracted) (S5). In this process, the average values of brightness levels are computed in units of partial regions broken up in step S4, and are arranged in an order (raster scan order) shown in FIG. 8 to express facial feature pattern data (to be simply referred to as a feature vector hereinafter):

(V11, V12, ..., Vnm−1, Vnm)

As a modification of the process in step S5, pixels in the feature region undergo density correction prior to the average value computation to normalize the density range. Alternatively, a feature emphasis filter process such as a differential process may be executed. Furthermore, other density or graphic feature amounts such as most frequent values (mode values), principal directions of edges (extracted by the differential process), and the like may be used in place of the average values as feature amounts in segmented small areas.

It is then checked if registration or verification is made (S6). If registration is to be made, a plurality of feature patterns are stored (S7, S8), dictionary data are generated using the scheme (partial space method) of prior art 2 (S9), and a procedure for registering dictionary data in the dictionary 7 together with personal attribute information is done (S10), thus ending registration.

On the other hand, if verification is to be made, a verification computation process using the scheme (partial space method) of prior art 2 is done (S11), and a verification level output process is then executed (S12).

As described above, according to the first embodiment, a single input facial image (still image) is to be processed. In consideration of variations of the input conditions, a plurality of successive facial images (moving image) may be captured at a given time interval, and may be buffered on the image memory 2-1b of the capture board 2-1 shown in FIG. 1. The method of making verification computation using a moving image (time-series images) is described in detail in prior art 3 (mutual partial space method).

In the flow upon processing a moving image, the processes in steps S1 to S4 can be the same as those in the flow chart in FIG. 4, and the contents of only steps S9 and S10 need only be changed. That is, after a predetermined number of feature patterns are stored as in registration, a statistical process such as main component analysis or the like is done based on these plurality of feature vectors, and a pattern verification process is then executed.

A characteristic feature of the first embodiment mentioned above lies in integrated control of processes of facial images from the cameras 1-1, 1-2, and 1-3. To summarize, the processor 4 executes the following control.

First, the cameras 1-1 and 1-2 detect the central positions of the eyes as two (right and left) feature points, and the camera 1-3 detects the two central points of the nasal cavities, thus obtaining a total of four feature points.

If this condition is not satisfied, and at least one of these cameras fails to detect an image, it is determined that the process at that time is not successful, and the process is interrupted immediately. Then, the process is retried or an error message is displayed for the user.

Second, upon registration, feature vectors corresponding to facial images from all the cameras 1-1, 1-2, and 1-3 are registered as a set of person data.

Third, if verification levels between facial images captured by all the cameras 1-1, 1-2, and 1-3 and registered data of a given person are output as M1, M2, and M3, it is determined that "that person is identified" only when a condition:

M1>=K1, and M2>=K2, and M3>=K3 where K1, K2, and K3 are predetermined threshold values is satisfied.

Upon searching for a person corresponding to the input facial image, of persons whose data satisfy the above condition (if no person data satisfies the above condition, "no match" is determined), a person corresponding to a maximum average value of verification levels, i.e., (M1+M2+M3)/3 is finally determined to be a match.

The second embodiment of the present invention will be described below.

The basic arrangement of an image processing apparatus according to the second embodiment is substantially the same as that in FIG. 1 (first embodiment), except that the cameras 1-1, 1-2, and 1-3 line up horizontally.

Figure 9:
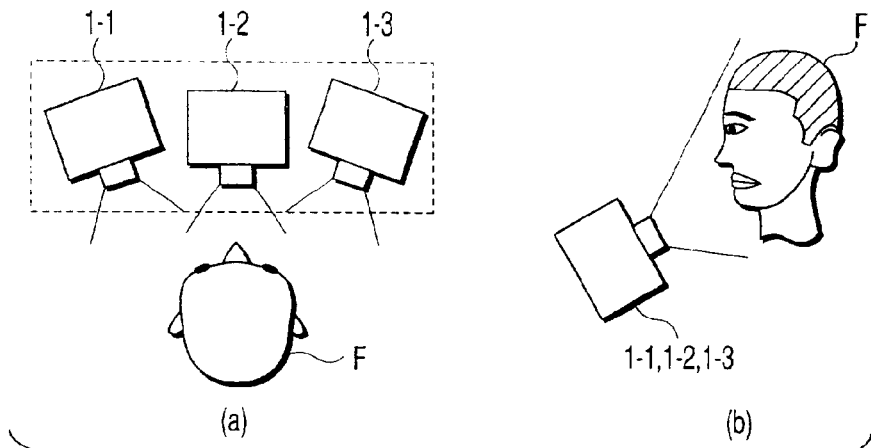
FIG. 9 shows an example of a camera layout in an image processing apparatus according to the second embodiment of the present invention.

The layout of these cameras 1-1, 1-2, and 1-3 is as shown in FIG. 9. That is, as shown in FIG. 9, the cameras 1-1, 1-2, and 1-3 line up horizontally at an appropriate spacing so as to be angled slightly upward. With this layout, the cameras 1-1, 1-2, and 1-3 respectively sense and capture a facial image of a left half-face pose, a looked-up facial image of a full-face pose, and a facial image of a right half-face pose.

Figure 10:
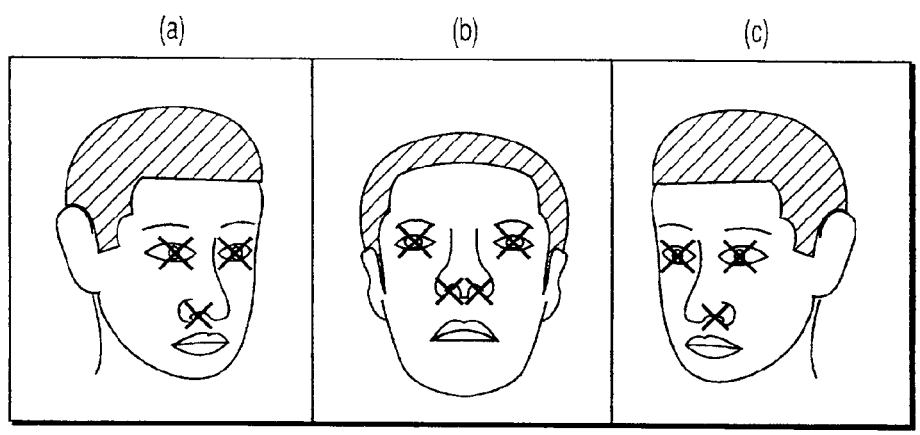
FIG. 10 shows an example of extracted facial images and feature points in the second embodiment.

Examples of facial images input from the cameras 1-1, 1-2, and 1-3 and feature points extracted therefrom are as shown in (a), (b), and (c) of FIG. 10, and "x" marks in these figures indicate the detected feature points. Note that (a) of FIG. 10 corresponds to the camera 1-1, (b) of FIG. 10 corresponds to the camera 1-2, and (c) of FIG. 10 corresponds to the camera 1-3.

The process executed by the processor 4 is substantially the same as that in the first embodiment, except that the process executed upon obtaining two feature points in the first embodiment is replaced by that executed upon obtaining three feature points, as will be described in detail below.

Examples of the normalization process upon obtaining three feature points will be explained below with reference to FIGS. 11 and 12.

Figure 11:
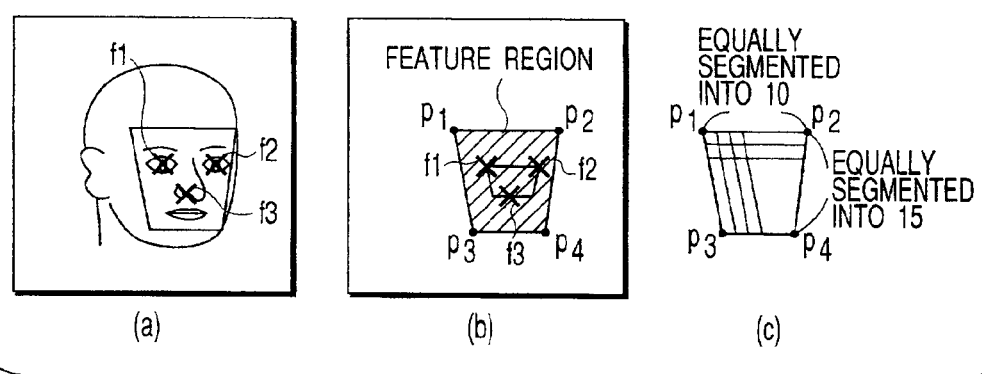
FIG. 11 is a view for explaining a normalization process when three feature points are obtained in the second embodiment.

More specifically, when three feature points are obtained from the right half-face facial image, as shown in (a) of FIG. 11, a rectangular region (p1, p2, p3, p4) based on a triangle (f1, f2, f3) is defined to be a feature region, as shown in (b) of FIG. 11. In this example, this feature region is broken up into 10×15 small rectangular regions, as shown in (c) of FIG. 11.

Figure 12:
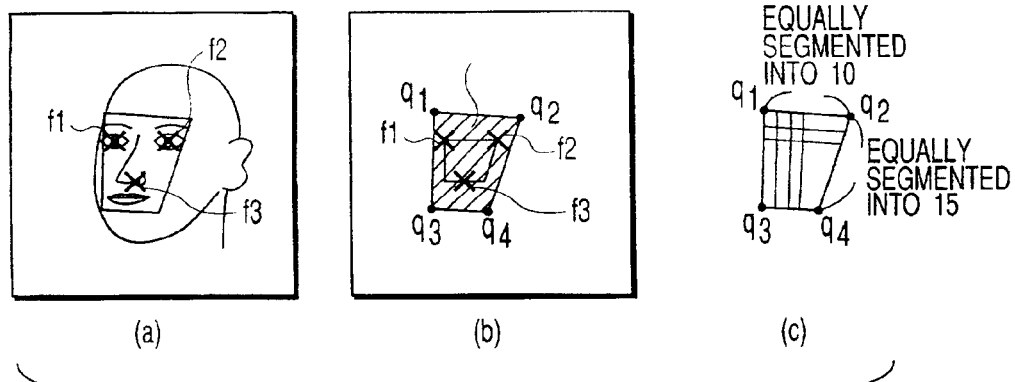
FIG. 12 is a view for explaining a normalization process when three feature points are obtained in the second embodiment.

Likewise, when three feature points are obtained from the left half-face facial image, as shown in (a) of FIG. 12, a rectangular region (q1, q2, q3, q4) based on a triangle (f1, f2, f3) is defined to be a feature region, as shown in (b) of FIG. 12. In this example, this feature region is broken up into 10×15 small rectangular regions, as shown in (c) of FIG. 12.

In order to obtain a rectangular region from three feature points, a line which is parallel to a line segment f1f2 and passes through f3 is drawn, two points separated a given width from f3 are set on the line on the two sides of f3, a rectangle having as vertices a total of four points including these two points, and f1 and f2 can be enlarged at a predetermined magnification. At this time, the magnification is set in advance for each camera. However, the present invention is not limited to this method, and a feature region need only be defined in advance so that it can be uniquely determined.

The third embodiment of the present invention will be described below.

The basic arrangement of an image processing apparatus according to the third embodiment is substantially the same as that in FIG. 1 (first embodiment), except that nine cameras 1-1, 1-2, . . . , 1-9 are set two-dimensionally.

Figure 13:
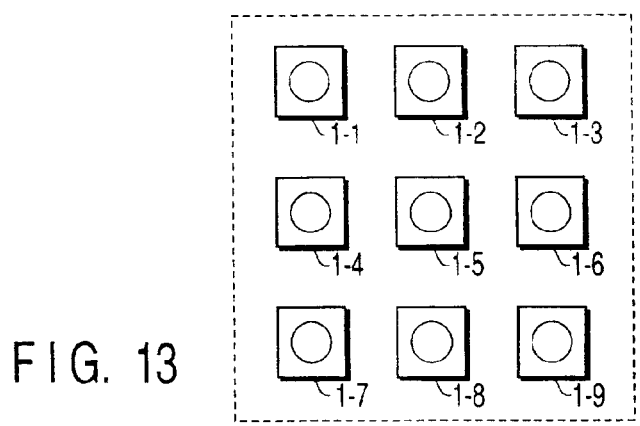
FIG. 13 shows an example of a camera layout in an image processing apparatus according to the third embodiment of the present invention.

The layout of these cameras 1-1, 1-2, . . . , 1-9 is as shown in FIG. 13. That is, as shown in FIG. 13, the cameras 1-1, 1-2, and 1-3 respectively capture slightly looked-down facial images of a left half-face pose, full-face pose, and right half-face pose. The cameras 1-4, 1-5, and 1-6 respectively capture facial images of a left half-face pose, full-face pose, and right half-face pose. Furthermore, the cameras 1-7, 1-8, and 1-9 respectively capture slightly looked-up facial images of a left half-face pose, full-face pose, and right half-face pose.

Note that the process executed by the processor 4 according to the third embodiment can be implemented by combining the processes of the first and second embodiments described above.

The fourth embodiment of the present invention will be described below.

The basic arrangement of an image processing apparatus according to the fourth embodiment is substantially the same as that in FIG. 1 (first embodiment). Also, the camera layout is the same as that in one of the first to third embodiments.

The process executed by the processor 4 according to the fourth embodiment can be realized by adding a feature vector extraction process to that explained in the first to third embodiments. That is, an integration process of feature vectors extracted from a plurality of facial images is added.

More specifically, when a plurality of cameras 1-1, 1-2, . . . , 1-n are deployed, if feature vectors:

camera 1-1: (V11, . . . , V1L1) (L1 dimension)

camera 1-2: (V21, . . . , V2L2) (L2 dimension)

. . .

camera 1-n: (Vn1, . . . , VnLn) (Ln dimension) are computed from the outputs of the cameras 1-1, 1-2, . . . , 1-n, these feature vectors are integrated by coupling in turn:

(V11, . . . , V1L1, V21, . . . , V2L2, . . . , Vn1, . . . , VnLn)

(L1+L2+ . . . +Ln) dimension

As a result of such feature vector integration, the same registration and verification processes (partial space method) as in a single camera described in, e.g., prior art 2, can be made although a plurality of cameras are used.

The fifth embodiment of the present invention will be described below.

The basic arrangement of an image processing apparatus according to the fifth embodiment is substantially the same as that in FIG. 1 (first embodiment). Also, the camera layout is the same as that in one of the first to third embodiments.

The process executed by the processor 4 according to the fifth embodiment can be realized by adding a feature vector extraction process to that explained in the first to third embodiments. Note that input facial images are time-serially captured at given time intervals, and a process to be added for the purpose of improving the verification precision is an integration process of feature vectors on the time series, as will be described below.

More specifically, when feature vectors at times 1, 2, . . . , s (assume that feature patterns from a plurality of cameras have already been integrated by the method of the fourth embodiment, and L represents that total dimension) are computed, the input feature vectors time 1: (V11, . . . , V1L)

time 2: (V21, . . . , V2L)

. . .

time s: (Vs1, . . . , VsL)

are integrated on the time series to obtain an average vector described by:

$(\overline{v1}, \overline{v2}, \ldots, \overline{vL})$ $$\overline{vi} = \frac{1}{s}\sum_{t=1}^{s} vt \cdot i \quad (EQ\ 1)$$

when a moving image is used.

As a result of integration on the time series, the method of prior art 2 can be used as in case of a single camera. The method of prior art 3 may be applied without executing such process for obtaining the average feature vector.

As described above, according to the first to fifth embodiments, a plurality of cameras are set within a range in which they satisfy a given condition so as to simultaneously capture facial images of an identical person, and a correction process is done on the basis of a total of four pieces of feature point position information of pupils and nasal cavities, thus improving the verification precision while maintaining the load on the user light as in the prior art.

When feature patterns extracted from a plurality of facial images are integrated to one to execute the same pattern verification process as in the prior art, increases in complicated computation and processing cost can be minimized.

The sixth embodiment of the present invention will be described below.

The basic arrangement of an image processing apparatus according to the sixth embodiment is substantially the same as that in FIG. 1 (first embodiment), except for the layout and use method of cameras 1-1, 1-2, . . . , 1-N, and a corresponding integration process.

Figure 14:
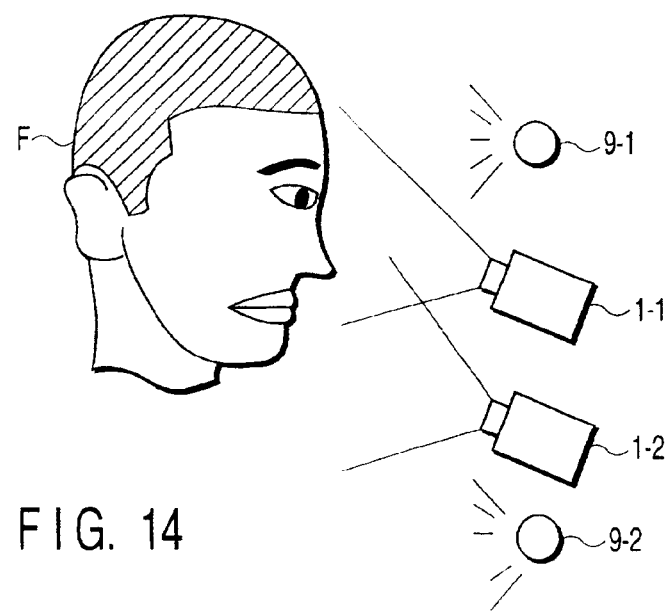
FIG. 14 shows an example of a camera layout in an image processing apparatus according to the sixth embodiment of the present invention.

FIG. 14 shows an example wherein two cameras 1-1 and 1-2 are laid out vertically. As shown in FIG. 14, the cameras 1-1 and 1-2 line up vertically at an appropriate spacing to be angled slightly upward. An object F is located in front of these cameras 1-1 and 1-2. With this layout, the cameras 1-1 and 1-2 sense slightly looked-up facial images of a full-face pose. In FIG. 14, reference numeral 9-1 denotes an illumination lamp arranged above the camera 1-1; and 9-2, an illumination lamp arranged below the camera 1-2.

In the example shown in FIG. 14, the camera 1-1 is set at a level that assumes the average height of an adult, and the camera 1-2 is set at a level that assumes the height of an adult equal to or lower than the average height or a child. Even when a very tall person falls outside the field of view of the camera, his or her facial image can be input when he or she bends down. An infant may be excluded from the process, or his or her facial image may be input using a stool or while being lifted in his or her parent's arms. Also, the camera 1-2 can be used for a handicapped person in a wheelchair.

The integration process is executed by the processor 4 according to the sixth embodiment as follows. That is, in the first embodiment, when feature point detection based on at least one of facial images from a plurality of cameras fails, it is determined that the process at that time is not successful, and the process is interrupted immediately. Then, the process is retried or an error message is displayed for the user. In the sixth embodiment, verification is done for a facial image from which feature points can be successfully detected, and if verification of at least one facial image is successful, it is determined that "the person is identified".

More specifically, if verification levels between facial images captured by the cameras 1-1 and 1-2, and registered data (dictionary data) of a given person are output as M1 and M2, it is determined that "that person is identified" when a condition:

$$M1 >= K1 \text{ or } M2 >= K2$$

where K1 and K2 are predetermined threshold values is satisfied.

With this process, flexible verification can be done in correspondence with individual height differences.

In the sixth embodiment, two cameras are used. However, three or more cameras may be used. In addition, only when verification of a predetermined number or more of facial images is successful in place of that of one of facial images, it is determined that "the person is identified". That is, if verification levels between facial images captured by the cameras 1-1, 1-2, ..., 1-N and registered data (dictionary data) of a given person are output as M1, M2, ..., Mn, it is determined that "that person is identified" when a condition:

$$R >= T \ (T \geq 2)$$

where R is the number of times Mi>+Ki (i=1, 2, ..., n) holds, and Ki and T are predetermined threshold values is satisfied.

The seventh embodiment of the present invention will be described below.

Figure 15:
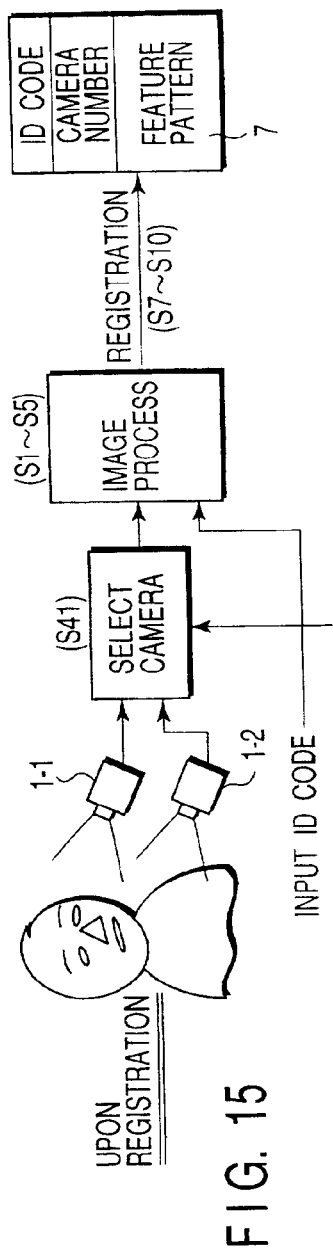
FIG. 15 is a chart for explaining a registration process according to the seventh embodiment of the present invention.

In the seventh embodiment, a camera used to obtain a facial image is determined in the registration and verification processes by the processor 4 in the sixth embodiment. That is, upon registration, a camera used to obtain a facial image is determined, and a facial image is registered together with the camera number. More specifically, as shown in FIG. 15, a registrant determines one of the cameras 1-1 and 1-2 which he or she would like to use depending on his or her physical construction and height, and selects that camera (S41). Also, the registrant inputs an ID code via a keyboard, card, or the like as his or her own identification information.

A facial image input by the selected camera undergoes the aforementioned image process to extract a feature pattern (S1 to S5), and the extracted feature pattern is registered in the dictionary 7 together with the input ID code of the registrant, and the camera number as the position information of the selected camera (i.e., position information indicating the image sensing position of an object image) (S7 to S10).

Note that the camera to be used may be determined by the registrant himself or herself, but a camera that can obtain a facial image from which feature points corresponding to two pupils and two nasal cavities are extracted, and the central portion of which is closest to these positions may be automatically determined. In this example, information indicating a camera to be used (camera number as camera position information) can also be used as personal information, thus setting higher security level.

Figure 16:
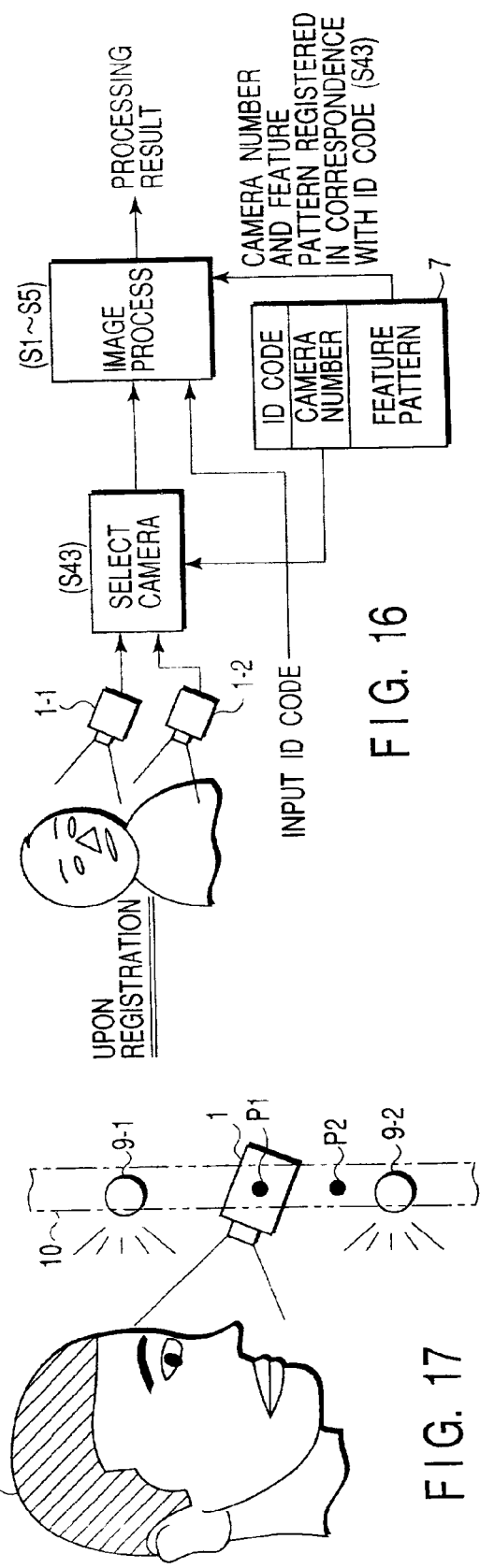
FIG. 16 is a chart for explaining a verification process according to the seventh embodiment.

Upon verification, a verification process is done for only a facial image obtained from a camera corresponding to the registered camera number. More specifically, as shown in, e.g., FIG. 16, a person to be verified inputs his or her own ID code via a keyboard, card, or the like, and the dictionary 7 is searched for the camera number and feature pattern registered in correspondence with that ID code (S42).

A camera corresponding to the camera number retrieved from the dictionary 7 is selected (S43), and a facial image input by the selected camera undergoes the aforementioned image process to extract a feature pattern (S1 to S5). The extracted feature pattern is verified with the feature pattern retrieved from the dictionary 7 to determine if the person to be verified is the person himself or herself (S11, S12).

In the seventh embodiment, two cameras are used. Alternatively, three or more cameras may be used. In addition, only one camera is selected, but when three or more cameras are used, two or more cameras may be selected.

The eighth embodiment of the present invention will be described below.

In the first to seventh embodiments, a required number of cameras are set in advance. However, in the eighth embodiment, a camera moving mechanism is arranged, and moves a single camera to a predetermined position so as to execute the aforementioned process. In this case, an image capture time is slightly prolonged, but only one camera is required, resulting in simple setting.

Figure 17:
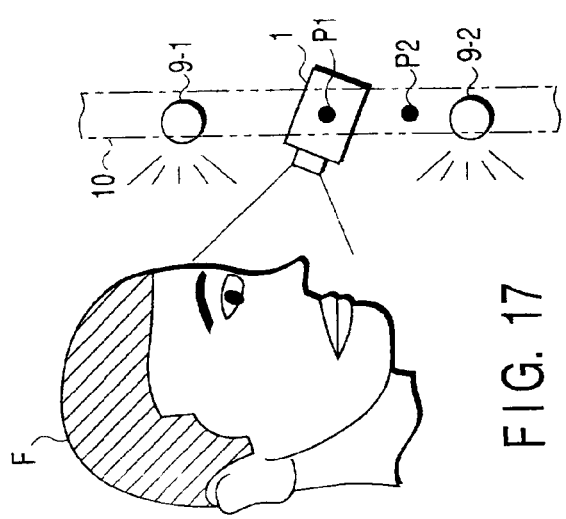
FIG. 17 shows an example of a camera layout in an image processing apparatus according to the eighth embodiment of the present invention.

FIG. 17 shows an example wherein one camera 1 is set. More specifically, as shown in FIG. 17, the camera 1 is fixed to a vertical guide rail 10 to be slidable vertically, and is moved by a camera moving mechanism (not shown) to a first position P1 (corresponding to the position of the camera 1-1 in FIG. 14) or a second position P2 (corresponding to the position of the camera 1-2 in FIG. 14). The camera 1 is set to be angled slightly upward.

Figure 18:
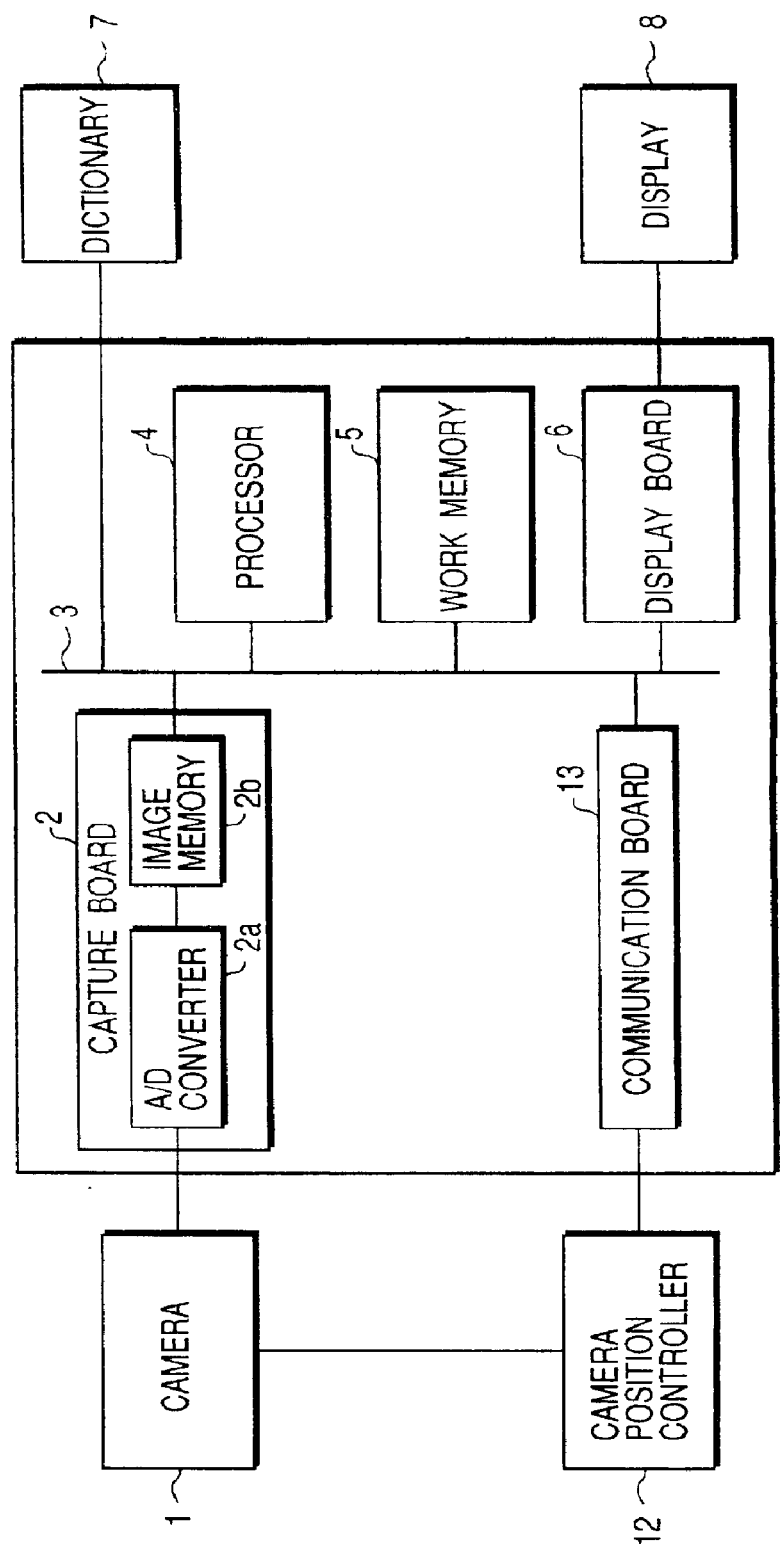
FIG. 18 is a schematic block diagram showing the arrangement of the image processing apparatus according to the eighth embodiment.

The basic arrangement of an image processing apparatus according to the eighth embodiment is substantially the same as that in FIG. 1 (first embodiment), except that the number of sets of cameras and capture boards is reduced to one, and a camera position controller 12 for controlling a camera moving mechanism 11 that moves the camera 1, and a communication board 13 for connecting the camera position controller 12 to the system bus 3 are added, as shown in FIG. 18.

The process executed by the processor 4 according to the eighth embodiment is basically the same as that in FIG. 4 (first embodiment), except for the contents of the verification computation process in step S11. The verification computation process in step 11 will be described in detail below with reference to the flow chart shown in FIG. 19.

The operation varies depending on whether 1:1 or 1:N verification is done (S21). Note that 1:1 verification is a verification process executed when a person to be verified inputs his or her own ID code to designate registered data to be verified, and 1:N verification is a verification process executed when a person to be verified does not input any ID code to select all registered data as data to be verified.

If 1:1 verification is made, the ID code input by the person to be verified is read (S22). Registered data (partial space) corresponding to the read ID code is read from the dictionary 7 (S23). A verification level between the spatial space of the registered data and an input partial space is computed to verify using, e.g., the partial space method (S24). The verification level is compared with a predetermined threshold value (S25, S26) to output a 1:1 verification result (S27).

If 1:N verification is made, all registered data to be verified are read from the dictionary 7 (S28). Verification levels with these registered data are computed (S29). A maximum one of the computed verification levels is selected (S30) and is output as a 1:N verification result (S32).

Figure 19:
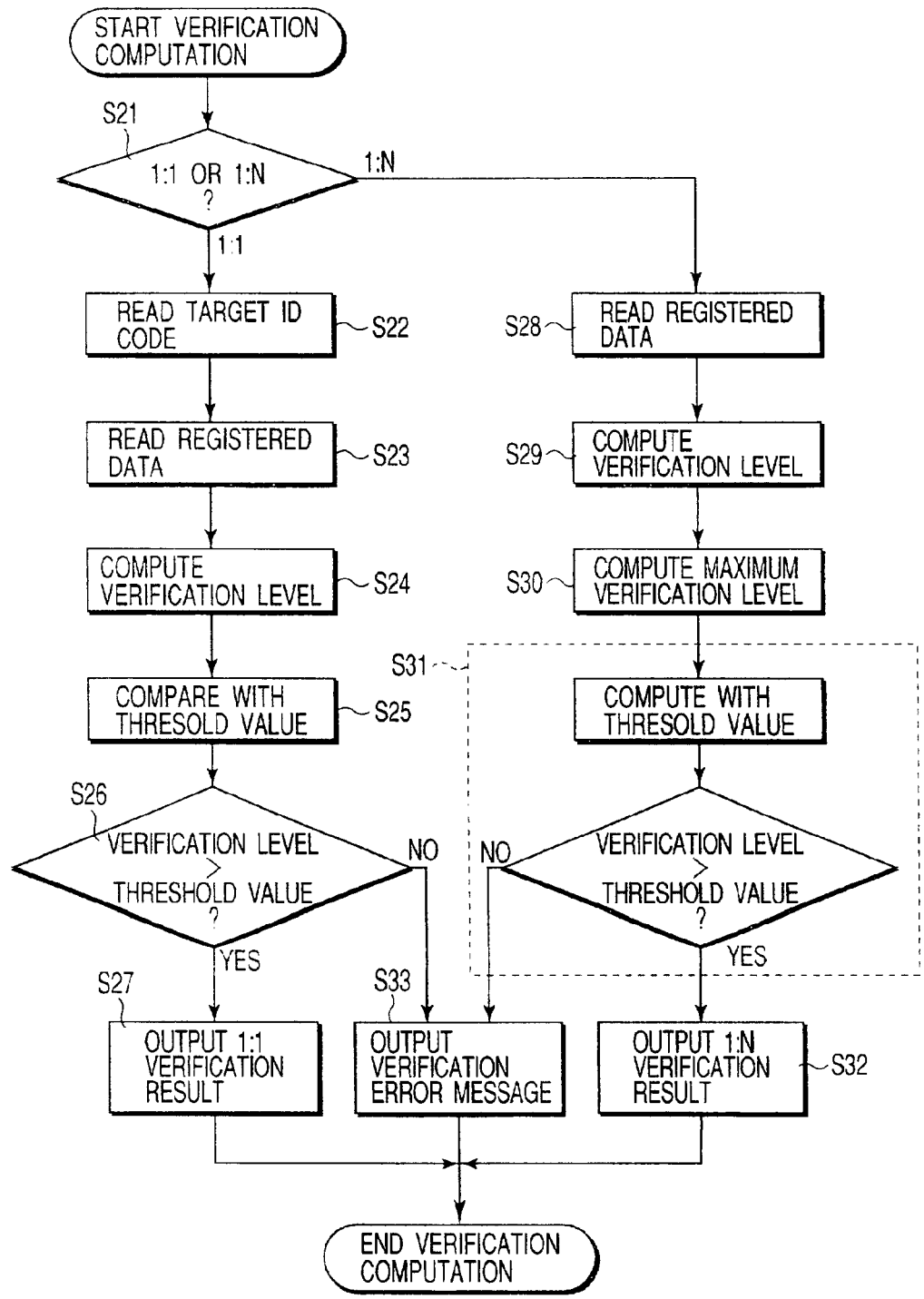
FIG. 19 is a flow chart for explaining a verification computation process by a processor according to the eighth embodiment.

In this case, if the maximum verification level may undergo a threshold value process like in step S31 bounded by the broken line in FIG. 19, it can be checked if the verification result is correct (S33). For example, if the verification level is too low, it is determined that no match is found.

Note that 1:N verification is a verification process executed when a person to be verified does not input any ID code to select all registered data as data to be verified, and corresponds to the verification process in the first to sixth embodiments described above.

In the eighth embodiment, only one camera is used, but two or more cameras may be used. Furthermore, only one camera is moved. However, when two or more cameras are used, these cameras may be moved.

The embodiments of the present invention have been explained, but the present invention is not limited to these specific embodiments and various changes may be made without departing from the scope of the invention. For example, the aforementioned embodiments may be appropriately combined.

In the above embodiments, a camera of a normal visible wavelength range is used. Alternatively, an infrared ray camera of an infrared range may be used, or a rangefinder that can obtain distance information (depth information) may be used. Also, image input devices of different types may be mixed.

As described above, according to the present invention, an image processing apparatus and method, which can reduce the load on the user upon registration and verification, can greatly improve verification performance, and can minimize increases in complicated computation and processing cost without largely changing a pattern verification process algorithm from a single direction can be provided.

By contrast, the technique of prior art 1 independently processes images although it uses a plurality of cameras, and a function is limited to detection of the face direction. In the techniques of prior arts 2 and 3, since the countenance of a person has three-dimensional shape information, two-dimensional facial image information captured from only one direction alone limits personal identification performance, and practical verification performance cannot become so high compared to fingerprint verification, retina and iris scans, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a first image sensing means for sensing an object image in a first direction to extract $X_1$ number of feature points from the object image;
a second image sensing means for sensing the object image in a second direction to extract $X_2$ number of feature points from the object image; and
a normalization means for extracting a plurality of feature points from first object image data obtained during sensing by the first image sensing means, checking whether the number of the extracted plurality of feature points corresponds to a preset $X_1$ number, extracting a plurality of feature points from second object image data obtained during sensing by the second image sensing means, checking whether the number of the extracted plurality of feature points corresponds to a preset $X_2$ number, setting a first feature region on the first object image data by a first method based on the $X_1$ number of feature points, setting a second feature region on the second object image data by a second method based on the $X_2$ number of feature points, segmenting the first feature region into a plurality of regions, computing predetermined information in each segmented region, computing a first feature pattern based on the computed predetermined information, segmenting the second feature region into a plurality of regions, computing predetermined information in each segmented region, and computing a second feature pattern based on the computed predetermined information.

2. An image processing apparatus comprising:
a first image sensing means for sensing an object image in a first direction to extract $X_1$ number of feature points from the object image;
a second image sensing means for sensing the object image in a second direction to extract $X_2$ number of feature points;
a normalization means for extracting a plurality of feature points from first object image data obtained during sensing by the first image sensing means, checking whether the number of the extracted plurality of feature points corresponds to a preset $X_1$ number, extracting a plurality of feature points from second object data obtained in sensing by the second image sensing means, checking whether the number of the extracted plurality of feature points corresponds to a preset $X_2$ number, setting a first feature region on the first object image data by a first method based on the $X_1$ number of feature points, setting a second feature region on the second image data by a second method based on the $X_2$ number of feature points, segmenting the first feature region into a plurality of regions, computing an average value of brightness levels in each segmented region, computing a first feature pattern based on the computed average value, segmenting the second feature region into a plurality of regions, computing an average value of brightness levels in each segmented region, and computing a second feature pattern based on the computed average value;
registration means for registering the first and second feature patterns computed by said normalization means as feature patterns associated with a predetermined object; and
verification means for specifying an object associated with the object image by comparing the first and second feature patterns computed by said normalization means with the first and second feature patterns registered in said registration means.

3. An apparatus according to claim 2, wherein said first and second image sensing means line up vertically, and
said normalization means computes the feature patterns using the $X_1$ number of feature points including central points of right and left pupils and central points of right and left nasal cavities of the first object image data, and the $X_2$ number of feature points including central points of right and left pupils of the second object image data.

4. An apparatus according to claim 2, wherein said first and second image sensing means line up horizontally, and
said normalization means computes the feature patterns using the $X_1$ number of feature points including central points of right and left pupils and central points of right and left nasal cavities of the first object image data, and the $X_2$ number of feature points including central points of right and left pupils and a central point of a left or light nasal cavity of the second object image data.

5. An apparatus according to claim 2, further comprising:
a third image sensing means for sensing the object image in a third direction to extract $X_3$ number of feature points from the object image; and
a fourth image sensing means for sensing the object image in a fourth direction to extract $X_4$ number of feature points from the object image, wherein said first and second image sensing means line up horizontally;

said third and fourth image sensing means line up vertically;

said normalization means extracts a plurality of feature points from third object image data obtained in sensing by the third image sensing means, checks whether the number of the extracted plurality of feature points corresponds to a preset $X_3$ number, extracts a plurality of feature points from fourth object image data obtained in sensing by the fourth image sensing means, checks whether the number of the extracted plurality of feature points corresponds to a preset $X_4$ number, sets a third feature region on the third object image data by a third method based on the $X_3$ number of feature points, sets a fourth feature region on the fourth object image data by a fourth method based on the $X_4$ number of feature points, segments the third feature region into a plurality of regions, computes an average value of brightness levels in each segmented region, computes a third feature pattern based on the computed average value, segments the fourth feature region into a plurality of regions, computes an average value of brightness levels in each segmented region, computes a fourth feature pattern based on the computed average value, and computes the first and second feature patterns and a third and fourth feature patterns by using the $X_1$ number of feature points including central points of right and left pupils and central points of right and left nasal cavities of the first object image data, the $X_2$ number of feature points including central points of right and left pupils of the second object image data, the $X_3$ number of feature points including central points of right and left pupils and central points of right and left nasal cavities of the third object image data, and the $X_4$ number of feature points including central points of right and left pupils and central points of left or right nasal cavities of the third object image data;

said registration means registers the first, second, third, and fourth feature patterns computed by said normalization means as feature patterns associated with a predetermined object;

said verification means specifies an object associated with the first, second, third, and fourth object image data by comparing the first, second, third and fourth feature patterns computed by said normalization means with the first, second, third and fourth feature patterns registered in said registration means.

6. An apparatus according to claim 2, wherein said normalization means extracts feature vectors of different dimensions from the respective first and second object image data acquired by said first and second image sensing means, and arranges the extracted feature vectors of different dimensions in turn to integrate them as a multi-dimensional feature pattern.

7. An apparatus according to claim 2, wherein said normalization means captures the first and second object image data acquired by said first and second image sensing means at predetermined time intervals, computes feature patterns of the first and second object image data of identical times, and arranges feature patterns of different times in turn to integrate them as a time-series feature pattern.

8. An image processing apparatus comprising:

an image input means for sensing an object image in a first direction to extract $X_1$ number of feature points from the object image, inputting first object image data obtained by the sensing, sensing the object image in a second direction to extract $X_2$ number of feature points from the object image, and inputting second object image data obtained by the sensing;

a feature extraction means for extracting a plurality of feature points from the first object image data input by the image input means, checking whether the number of the extracted plurality of feature points corresponds to a preset $X_1$ number, extracting a plurality of feature points from the second object image data input by the image input means, checking whether the number of the extracted plurality of feature points corresponds to a preset $X_2$ number, setting a first feature region on the first object image data by a first method based on the $X_1$ number of feature points, setting a second feature region on the second object image data by a second method based on the $X_2$ number of feature points, extracting a first feature pattern from the first feature region, and extracting a second feature pattern from the second feature region;

verification means for verifying the first and second feature patterns extracted by said feature extraction means with first and second reference feature patterns which are registered in advance; and discrimination means for, when at least one of the first and second feature patterns extracted by said feature extraction means matches the first and second reference feature patterns which are registered in advance as a result of verification of said verification means, determining that an object associated with the first and second object image data is a person himself or herself.

9. An apparatus according to claim 8, wherein said image input means has first and second image sensing means which are set in advance at first and second positions, and sense an object image from first and second positions, and inputs the first and second object image data at the first and second image sensing positions using said first and second image sensing means.

10. An apparatus according to claim 8, wherein said feature extraction means comprises:

a feature pattern extraction means for segmenting the first feature region into a plurality of regions, computing an average value of brightness levels in each segmented region, computing a first feature pattern based on the computed average value, segmenting the second feature region into a plurality of regions, computing an average value of brightness levels in each segmented region, and computing a second feature pattern based on the computed average value.

11. An image processing apparatus comprising:

image processing means for sensing object images from different directions, extracting feature points from the sensed object images, and computing a feature pattern on the basis of the extracted feature points;

image input means for sensing an object image from different positions, and inputting a plurality of object images at different image sensing positions;

input image determination means for determining an image sensing position of an object image to be used from the plurality of object images input by said image input means upon registration of a feature pattern;

first feature extraction means for extracting a feature pattern which represents a feature of an object from the object image determined by said input image determination means;

registration means for registering the feature pattern extracted by said first feature extraction means as a reference feature pattern associated with the object in correspondence with position information indicating the image sensing position of the corresponding object image;

verification image selection means for selecting an object image at an image sensing position, which corresponds to the position information registered together with the feature pattern of the object to be verified registered in said registration means, of the plurality of object images input by said image input means upon verification of a feature pattern;

second feature extraction means for extracting a feature pattern which represents a feature of the object from the object image selected by said verification image selection means; and verification means for specifying an object associated with the object image by verifying the feature pattern extracted by said second feature extraction means with the feature pattern of the object to be verified registered in said registration means.

12. An image processing apparatus comprising:

image processing means for sensing object images from different directions, extracting feature points from the sensed object images, and computing a feature pattern on the basis of the extracted feature points;

a plurality of image sensing means, respectively set in advance at a plurality of predetermined positions, for sensing an object image from a plurality of different positions;

determination means for determining a position of the image sensing means to be used of said plurality of image sensing means upon registration of a feature pattern;

first feature extraction means for extracting a feature pattern which represents a feature of an object from the object image obtained by the image sensing means determined by said determination means;

registration means for registering the feature pattern extracted by said first feature extraction means as a reference feature pattern associated with the object in correspondence with position information indicating the position of the image sensing means determined by said determination means;

selection means for selecting the image sensing means at a position, which corresponds to the position information registered together with the feature pattern of the object in said registration means, of said plurality of image sensing means upon verification of a feature pattern;

second feature extraction means for extracting a feature pattern which represents a feature of the object from the object image obtained by the image sensing means selected by said selection means; and verification means for specifying an object associated with the object image by verifying the feature pattern extracted by said second feature extraction means with the feature pattern of the object registered in said registration means.

13. An apparatus according to claim 12, wherein each of said first and second feature extraction means comprises:

feature point detection means for detecting feature points of an object from the input object image;

feature region setting means for setting a feature region on the basis of the feature points detected by said feature point detection means;

region segmentation means for segmenting the feature region set by said feature region setting means into a plurality of regions; and feature pattern extraction means for computing brightness average values in the regions segmented by said region segmentation means, and extracting a feature pattern which represents a feature of the object on the basis of the brightness average values.

14. An image processing method comprising:

the first step of sensing an object image in a first direction to extract $X_1$ number of feature points from the object image, and sensing the object image in a second direction to extract $X_2$ number of feature points from the object image; and the second step of extracting a plurality of feature points from first object image data obtained by the sensing of the first step, checking whether the number of the extracted plurality of feature points corresponds to a preset $X_1$ number, extracting a plurality of feature points from second object image data obtained by the sensing of the first step, checking whether the number of the extracted plurality of feature points corresponds to a preset $X_2$ number, setting a first feature region on the first object image data by a first method based on the $X_1$ number of feature points, setting a second feature region on the second object image data by a second method based on the $X_1$ number of feature points, segmenting the first feature region into a plurality of regions, computing predetermined information in each segmented region, computing a first feature pattern based on the computed predetermined information, segmenting the second feature region into a plurality of regions, computing predetermined information in each segmented region, and computing a second feature pattern based on the predetermined information.

15. An image processing method comprising:

the first step of sensing an object image in a first direction to extract $X_1$ number of feature points from the object image, and sensing the object image in a second direction to extract $X_2$ number of feature points from the object image;

the second step of extracting a plurality of feature points from first object image data obtained by the sensing of the first step, checking whether the number of the extracted plurality of feature points corresponds to a preset $X_1$ number, extracting a plurality of feature points from second object image data obtained by the sensing of the first step, checking whether the number of the extracted plurality of feature points corresponds to a preset $X_2$ number, setting a first feature region on the first object image data by a first method based on the $X_1$ number of feature points, setting a second feature region on the second object image data by a second method based on the $X_2$ number of feature points, segmenting the first feature region into a plurality of regions, computing an average value of brightness levels in each segmented region, computing a first feature pattern based on the computed average value, segmenting the second feature region into a plurality of regions, computing an average value of brightness levels in each segmented region, and computing a second feature pattern based on the computed average value;

the third step of registering the first and second feature patterns computed in the second step as feature patterns associated with a predetermined object; and the fourth step of specifying an object associated with the object image by comparing the first and second feature patterns computed in the second step with the first and second feature patterns registered in the third step.

16. A method according to claim 15, wherein the first step includes the step of sensing the object image from the first and second directions which line up vertically, and the second step includes the step of computing the feature pattern using the $X_1$ number of feature points including central points of right and left pupils and central points of right and left nasal cavities of the first object image data, and the $X_2$ number of feature points including central points of right and left pupils of the second object image data.

17. A method according to claim 15, wherein the first step includes the step of sensing the object image from the first and second directions which line up horizontally, and the second step includes the step of computing the feature pattern using the $X_1$ number of feature points including central points of right and left pupils and central points of right and left nasal cavities of the first object image data, and the $X_2$ number of feature points including central points of right and left pupils and a central point of a left or light nasal cavity of the second object image data.

18. A method according to claim 15, wherein the first step includes the step of sensing the object image in a third direction to extract $X_3$ number of feature points from the object image, and sensing the object image in a fourth direction to extract $X_4$ number of feature points from the object image;

said first and second directions are horizontal direction and said third and fourth directions are vertical direction;

said second step includes extracting a plurality of feature points from third object image data obtained by the sensing in the third direction, checking whether the number of the extracted plurality of features points corresponds to a preset $X_3$ number, extracting a plurality of feature points from fourth object image data obtained by the sensing in the fourth direction, checking whether the number of the extracted plurality of feature points corresponds to a preset $X_4$ number, setting a third feature region on the third object image data by a third method based on the $X_3$ number of feature points, setting a fourth region on the fourth object image data by a fourth method based on the $X_4$ number of feature points, segmenting the third feature region into a plurality of regions, computing an average value of brightness levels in each segmented region, computing a third feature pattern based on the computed average value, segmenting the fourth feature region into a plurality of regions, computing an average value of brightness levels in each segmented region, computing a fourth feature pattern based on the computed average value, computing the first and second feature patterns and a third and fourth feature patterns by using the $X_1$ number of feature points including central points of right and left pupils and central points of right and left nasal cavities of the first object image data, the $X_2$ number of feature points including central points of right and left pupils of the second object image data, the $X_3$ number of feature points including central points of right and left pupils and central points of right and left nasal cavities of the third object image data, and the $X_4$ number of feature points including central points of right and left pupils and central points of left or right nasal cavities of the third object image data;

said third step registers the first, second, third, and fourth feature patterns computed in the second step as feature patterns associated with a predetermined object; and said fourth step specifies an object associated with the first, second, third, and fourth object image data by comparing the first, second, third and fourth feature patterns computed by said second step with the first, second, third and fourth feature patterns registered in said third step.

19. A method according to claim 15, wherein the second step includes the step of extracting feature vectors of different dimensions from respective the first and second object image data acquired in the first step, and arranging the extracted feature vectors of different dimensions in turn to integrate them as a multi-dimensional feature pattern.

20. A method according to claim 15, wherein the second step includes the step of capturing the first and second object image data acquired in the first step at predetermined time intervals, computing feature patterns of the first and second object image data of identical times, and arranging feature patterns of different times in turn to integrate them as a time-series feature pattern.

21. An image processing method comprising:

the first step of sensing an object image in a first direction to extract $X_1$ number of feature points from the object image, inputting first object image data obtained by the sensing, sensing the object image in a second direction to extract $X_2$ number of feature points from the object image, and inputting second object image data obtained by the sensing;

the second step of extracting a plurality of object image data from the first object image data input in the first step, checking whether the number of the extracted plurality of feature points corresponds to a preset $X_1$ number, extracting a plurality of feature points from the second object image data input in the first step, checking whether the number of extracted plurality of feature points corresponds to a preset $X_2$ number, setting a first feature region on the first object image data by a first method based on the $X_1$ number of feature points, setting a second feature region on the second object image data by a second method based on the $X_2$ number of feature points, extracting a first feature pattern from the first feature region, and extracting a second feature pattern from the second feature region;

the third step of verifying the first and second feature patterns extracted in the second step with first and second reference feature patterns which are is registered in advance; and the fourth step of determining, when at least one of first and second feature patterns extracted in the second step matches the first and second reference feature patterns which are registered in advance as a result of verification of the third step, that an object associated with the first and second object image data is a person himself or herself.

22. A method according to claim 21, wherein the first step includes the step of inputting the first and second object image data at the first and second image sensing positions using first and second image sensing means which are set in advance at first and second positions, and sense an object image from the first and second positions.

23. A method according to claim 21, wherein the second step includes:

segmenting the first feature region into a plurality of regions, computing an average value of brightness levels in each segmented region, computing a first feature pattern based on the computed average value, segmenting the second feature region into a plurality of regions, computing an average value of brightness levels in each segmented region, computing a second feature pattern based on the computed average value.

24. An image processing method comprising:

the first step of sensing object images from different positions, extracting feature points from the sensed object images, and computing a feature pattern on the basis of the extracted feature points, and inputting a plurality of object images at different image sensing positions;

the second step of determining an image sensing position of an object image to be used from the plurality of object images input in the first step upon registration of a feature pattern;

the third step of extracting a feature pattern which represents a feature of an object from the object image determined in the second step;

the fourth step of registering the feature pattern extracted in the third step as a reference feature pattern associated with the object in correspondence with position information indicating the image sensing position of the corresponding object image;

the fifth step of selecting an object image at an image sensing position, which corresponds to the position information registered together with the feature pattern of the object to be verified registered in the fourth step, of the plurality of object images input in the first step upon verification of a feature pattern;

the sixth step of extracting a feature pattern which represents a feature of the object from the object image selected in the fifth step; and the seventh step of specifying an object associated with the object image by verifying the feature pattern extracted in the sixth step with the feature pattern of the object to be verified registered in the fourth step.

25. An image processing method comprising:

the first step of sensing object images from different positions, extracting feature points from the sensed object images, and computing a feature pattern on the basis of the extracted feature points, wherein the first step of inputting a plurality of object images at different image sensing positions uses a plurality of image sensing means, respectively set in advance at a plurality of predetermined positions, for sensing an object image from a plurality of different positions;

the second step of determining a position of the image sensing means to be used of said plurality of image sensing means upon registration of a feature pattern;

the third step of extracting a feature pattern which represents a feature of an object from the object image obtained by the image sensing means determined in the second step;

the fourth step of registering the feature pattern extracted in the third step as a reference feature pattern associated with the object in correspondence with position information indicating the position of the image sensing means determined in the second step;

the fifth step of selecting the image sensing means at a position, which corresponds to the position information registered together with the feature pattern of the object in the fourth step, of said plurality of image sensing means upon verification of a feature pattern;

the sixth step of extracting a feature pattern which represents a feature of the object from the object image obtained by the image sensing means selected in the fifth step; and the seventh step of specifying an object associated with the object image by verifying the feature pattern extracted in the sixth step with the feature pattern of the object registered in the fourth step.

26. A method according to claim 25, wherein each of the third and sixth steps includes:

the step of detecting feature points of an object from the input object image;

the step of setting a feature region on the basis of the detected feature points;

the step of segmenting the set feature region into a plurality of regions; and the step of computing brightness average values in the segmented regions, and extracting a feature pattern which represents a feature of the object on the basis of the brightness average values.

* * * * *